US008669843B2

(12) United States Patent
Chen

(10) Patent No.: US 8,669,843 B2
(45) Date of Patent: Mar. 11, 2014

(54) FINGERPRINT DETECTION DEVICE AND METHOD AND ASSOCIATED TOUCH CONTROL DEVICE WITH FINGERPRINT DETECTION

(75) Inventor: Chih-Chiang Chen, Taipei Hsien (TW)

(73) Assignee: Acer Incorporated (TW)

( * ) Notice: Subject to any disclaimer, the term of this patent is extended or adjusted under 35 U.S.C. 154(b) by 1443 days.

(21) Appl. No.: 12/317,455

(22) Filed: Dec. 23, 2008

(65) Prior Publication Data

US 2010/0098303 A1   Apr. 22, 2010

(30) Foreign Application Priority Data

Oct. 17, 2008 (TW) ................................ 97140074 A

(51) Int. Cl.
*G06K 9/00* (2006.01)
*G06F 7/04* (2006.01)
*G06F 3/044* (2006.01)

(52) U.S. Cl.
USPC .......... 340/5.83; 340/5.53; 345/174; 382/124

(58) Field of Classification Search
USPC ......... 382/115, 124, 125, 103, 107, 116, 312, 382/313; 340/1.1, 2.1, 2.2, 2.21, 2.7, 5.83, 340/14.1, 14.2, 14.6, 5.1, 5.2, 5.51, 5.52, 340/5.74, 5.82, 14.61, 14.62–14.69; 348/14.02; 463/36, 37; 345/164, 165, 345/173–178; 178/18.01, 18.06, 18.11
See application file for complete search history.

(56) References Cited

U.S. PATENT DOCUMENTS

| 5,325,442 A  * | 6/1994  | Knapp ........................... 382/124 |
| 5,869,791 A  * | 2/1999  | Young ......................... 178/20.01 |
| 6,108,438 A  * | 8/2000  | Bird et al. ...................... 382/124 |
| 6,411,727 B1   | 6/2002  | Harkin .............................. 710/1 |
| 7,099,497 B2 * | 8/2006  | Chou et al. ..................... 382/124 |
| 7,755,369 B2 * | 7/2010  | Chuang et al. ................. 324/686 |
| 2001/0040989 A1* | 11/2001 | Kovacs-Vajna ............... 382/125 |
| 2003/0190061 A1* | 10/2003 | Chou et al. ..................... 382/124 |
| 2004/0107301 A1* | 6/2004  | Sato et al. ......................... 710/1 |
| 2004/0252867 A1* | 12/2004 | Lan et al. ....................... 382/124 |
| 2005/0031175 A1* | 2/2005  | Hara et al. ..................... 382/124 |
| 2005/0259851 A1* | 11/2005 | Fyke .............................. 382/124 |
| 2008/0069413 A1* | 3/2008  | Riedijk et al. ................. 382/124 |
| 2009/0219253 A1* | 9/2009  | Izadi et al. ..................... 345/173 |

FOREIGN PATENT DOCUMENTS

EP        0932117        7/1999  ............. G06K 11/16

* cited by examiner

*Primary Examiner* — Benjamin C Lee
*Assistant Examiner* — Stephen Burgdorf

(57) ABSTRACT

A fingerprint detection device and method and an associated touch control device with fingerprint detection are disclosed. The fingerprint detection device includes special detecting units for upgrading the accuracy of fingerprint detection. The fingerprint detection device comprises a plurality of detecting units, a driving circuit and a reading circuit. Each detecting unit includes a fingerprint electrode and a storage capacitor coupled to the fingerprint electrode. A sense capacitor can be formed between the fingerprint electrode and a finger, where the sense capacitor is parallel connected to the storage capacitor. The driving circuit is coupled to the detecting units and provides a charging signal to charge an equivalent capacitor of each detecting unit, where the capacitance of the equivalent capacitor is determined according to whether the sense capacitor is formed within the detecting unit. The reading circuit is coupled to the detecting units and reads the voltage of the storage capacitor after the equivalent capacitor is charged, so as to determine whether the detecting unit detects a portion of fingerprint and the detected portion is a furrow or ridge.

7 Claims, 11 Drawing Sheets

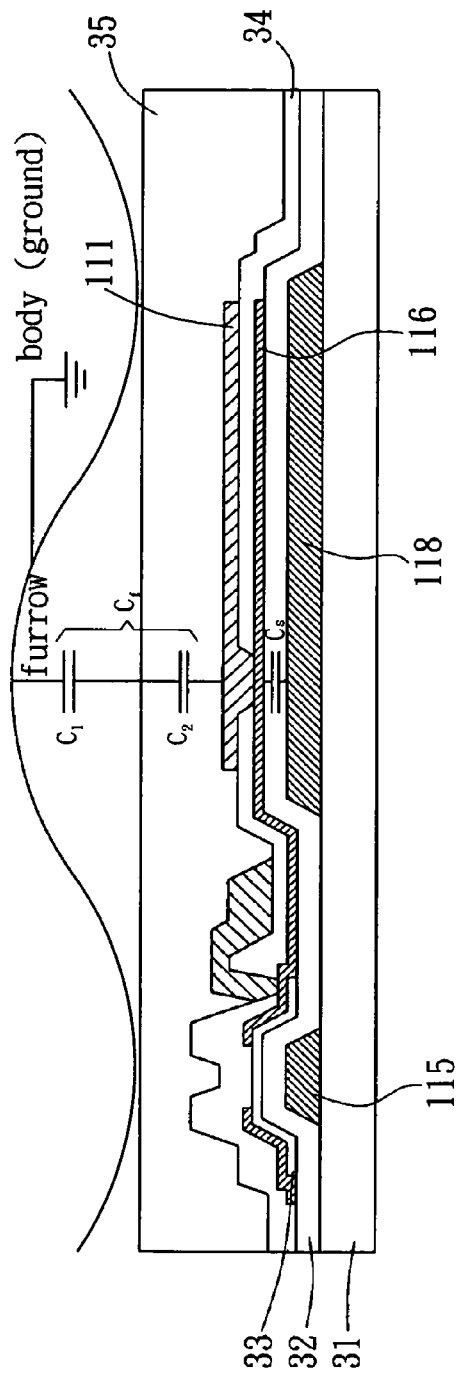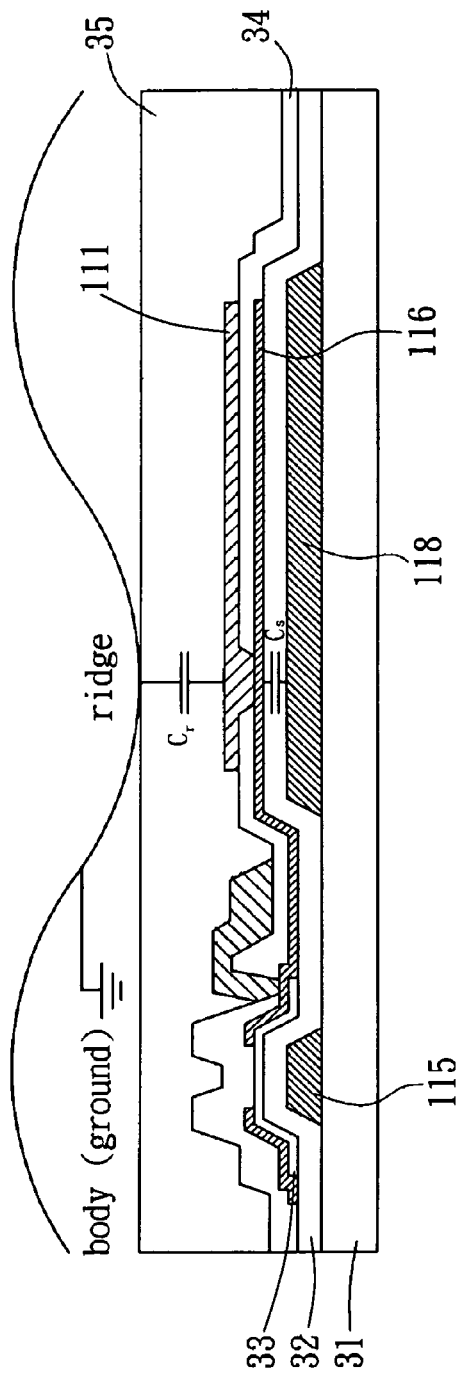
FIG. 3A
FIG. 3B

| L | L | L | L | L | L | L | L | L | L | L |
|---|---|---|---|---|---|---|---|---|---|---|
| L | H | M | M | M | M | M | L | L | L | L |
| L | H | M | H | H | H | H | M | L | L | L |
| L | H | M | M | M | M | H | M | L | L | L |
| L | H | H | H | M | H | H | M | L | L | L |
| L | H | M | M | M | H | M | H | M | L | L |
| L | H | M | H | M | M | H | M | M | L | L |
| L | H | M | H | H | M | H | M | M | L | L |
| L | L | H | M | M | M | H | M | H | M | L |
| L | L | L | H | H | H | M | M | H | M | L |

FIG. 5

FINGERPRINT DETECTION DEVICE AND METHOD AND ASSOCIATED TOUCH CONTROL DEVICE WITH FINGERPRINT DETECTION

BACKGROUND OF INVENTION

1. Field of the Invention

The present invention relates to fingerprint detection, and more particularly to a fingerprint detection device and method and an associated touch control device with fingerprint detection.

2. Description of the Prior Art

Fingerprint detection is one of the most popular biometrics for identity recognition now. Since each person's fingerprint is different, the true identity of a person can be recognized by performing fingerprint detection on him. Fingerprint detection has various advantages in identity recognition, and thus many electronic products have integrated the function of fingerprint detection, such as the notebooks, cellular phones, portable disks, etc.

In order to effectively perform fingerprint detection, the design of a fingerprint detector is a key factor. The detecting area of a traditional fingerprint detector is designed in a strip shape. When a person performs fingerprint detection, he needs to move his finger quickly to achieve sweeping scanning. Then, the generated strip-shaped images should be recombined to generate an entire fingerprint. However, this approach has limitation on the speed of sweeping the finger and the force of pressing the detecting area, and also encounters the problems resulted from uneven touch and image recombination.

Besides, in order to enable a fingerprint detector to detect an entire fingerprint, it usually needs to use multiple detecting units to form a large-area detecting matrix which can generate the entire fingerprint one time, without need to perform the recombination of fingerprint pieces. The capacitive fingerprint detector is a common detector for detecting the entire fingerprint, and its detecting unit can form different sense capacitors when detecting different portions of the fingerprint, i.e. furrow and ridge. By performing data writing and reading operation to the formed sense capacitor, the capacitive fingerprint detector can determine whether the detected fingerprint is the furrow or ridge. Thus, it is very important for the capacitive fingerprint detector about how to use this property to design the detecting unit.

SUMMARY OF INVENTION

It is therefore one objective of the present invention to provide a capacitive fingerprint detection device and method which employs specially designed detecting units to simplify hardware circuits and to avoid the mutual interference between neighboring detecting units and the interference of external static electricity, thereby upgrading the accuracy of fingerprint detection.

Another objective of the present invention is to provide a touch control device with fingerprint detection, thereby providing both the functions of fingerprint detection and touch control simultaneously.

A fingerprint detection device provided by the present invention comprises: a plurality of detecting units, each of which comprises a fingerprint electrode and a storage capacitor coupled to the fingerprint electrode, wherein a sense capacitor formed between the fingerprint electrode and a finger is parallel connected to the storage capacitor; a driving circuit, coupled to the detecting units, for providing a charging signal to charge an equivalent capacitor within each of the detecting units, wherein a capacitance of the equivalent capacitor is determined according to whether the sense capacitor is formed within the detecting unit; and a reading circuit, coupled to the detecting units, for reading a voltage of the storage capacitor of each of the detecting units after the equivalent capacitor is charged.

A touch control device with fingerprint detection provided by the present invention comprises the above fingerprint detection device, in which the detecting units are configured as a fingerprint detecting area and a touch control area, and a density of detecting unit of the fingerprint detecting area is larger than that of the touch control area.

A fingerprint detection method provided by the present invention comprises steps of: providing a plurality of detecting units, each of which comprises a fingerprint electrode and a storage capacitor coupled to the fingerprint electrode, wherein a sense capacitor formed between the fingerprint electrode and a finger is parallel connected to the storage capacitor; providing a charging signal to charge an equivalent capacitor within each of the detecting units, wherein a capacitance of the equivalent capacitor is determined according to whether the sense capacitor is formed within the detecting unit; and reading a voltage of the storage capacitor of each of the detecting units after the equivalent capacitor is charged.

BRIEF DESCRIPTION OF THE DRAWINGS

FIGS. 3A and 3B are cross-sectional diagrams of the detecting unit of FIG. 1.

FIG. 5 shows the voltage values read from each detecting unit of FIG. 1.

DETAILED DESCRIPTION

Figure 1:
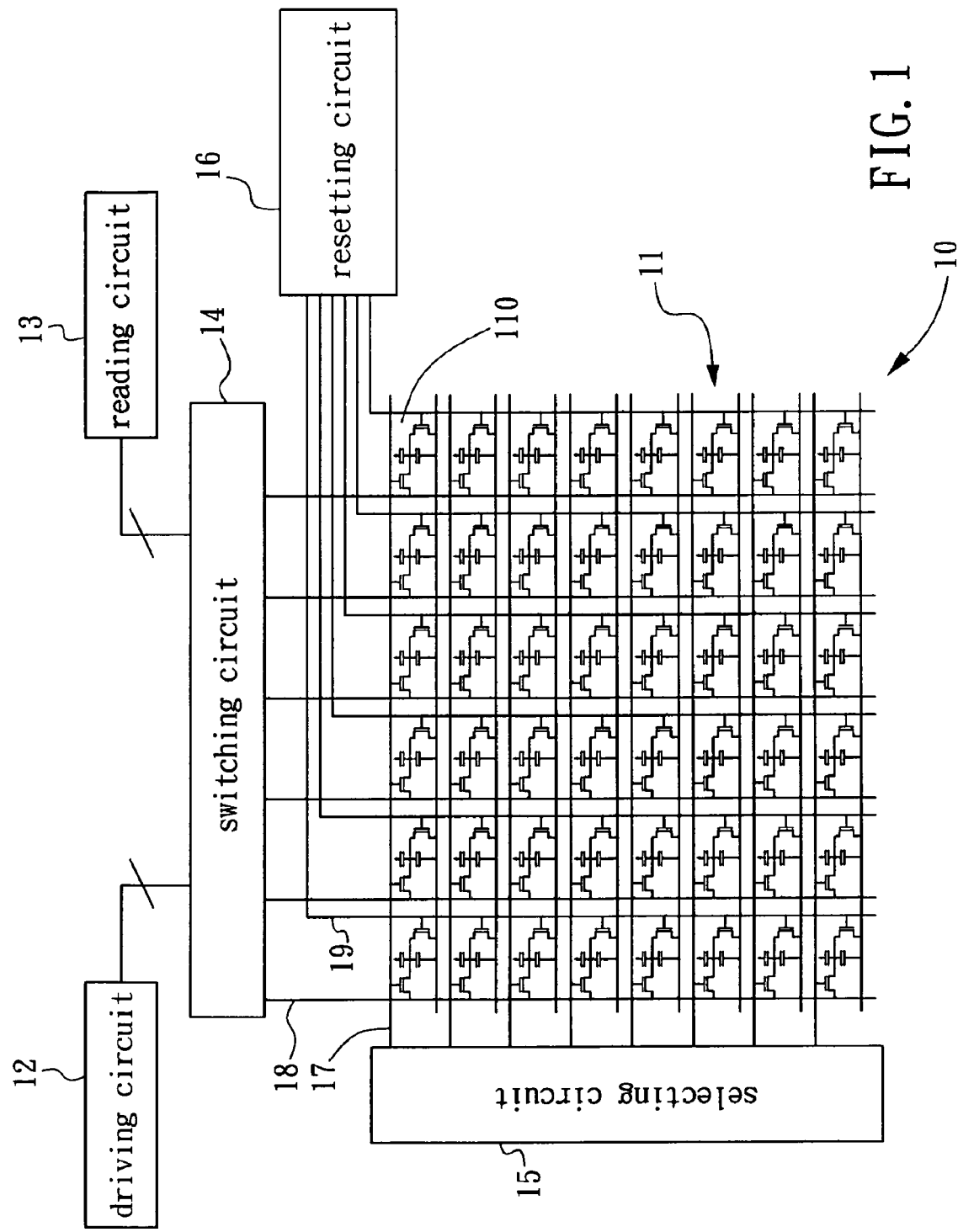
FIG. 1 is a block diagram of the first preferred embodiment of the capacitive fingerprint detection device according to the present invention.

FIG. 1 is a block diagram of the first preferred embodiment of the capacitive fingerprint detection device according to the present invention, wherein the fingerprint detection device 10 includes a detecting matrix 11, a driving circuit 12, a reading circuit 13, a switching circuit 14, a selecting circuit 15 and a resetting circuit 16. The detecting matrix 11 includes a plurality of detecting units 110 which are configured as a plurality of horizontal rows and vertical columns (In FIG. 1, the detecting matrix 11 is shown as, but not limited to, eight rows and six columns). The selecting circuit 15 is coupled to the detecting matrix 11 via a plurality of control lines 17, and each control line 17 is coupled to one row of detecting units 110. The switching circuit 14 is coupled to the detecting matrix 11 via a plurality of data lines 18, and each data line 18 is coupled to one column of detecting units 110. The driving circuit 12 and the reading circuit 13 is respectively coupled to the switching circuit 14. The switching circuit 14 determines to connect the data lines 18 to the driving circuit 12 or the reading circuit 13, so as to make the driving circuit 12 or the reading circuit 13 can be coupled to the detecting matrix 11 via the data lines 18. The resetting circuit 16 is coupled to the detecting matrix 11 via a plurality of reset lines 19, and each reset line 19 is coupled to one column of detecting units 110. It should be noted that each control line 17 can also be configured as coupled to one column of detecting units 110, while each data line 18 and each reset line 19 can also be configured as respectively coupled to one row of detecting units 110.

Figure 2:
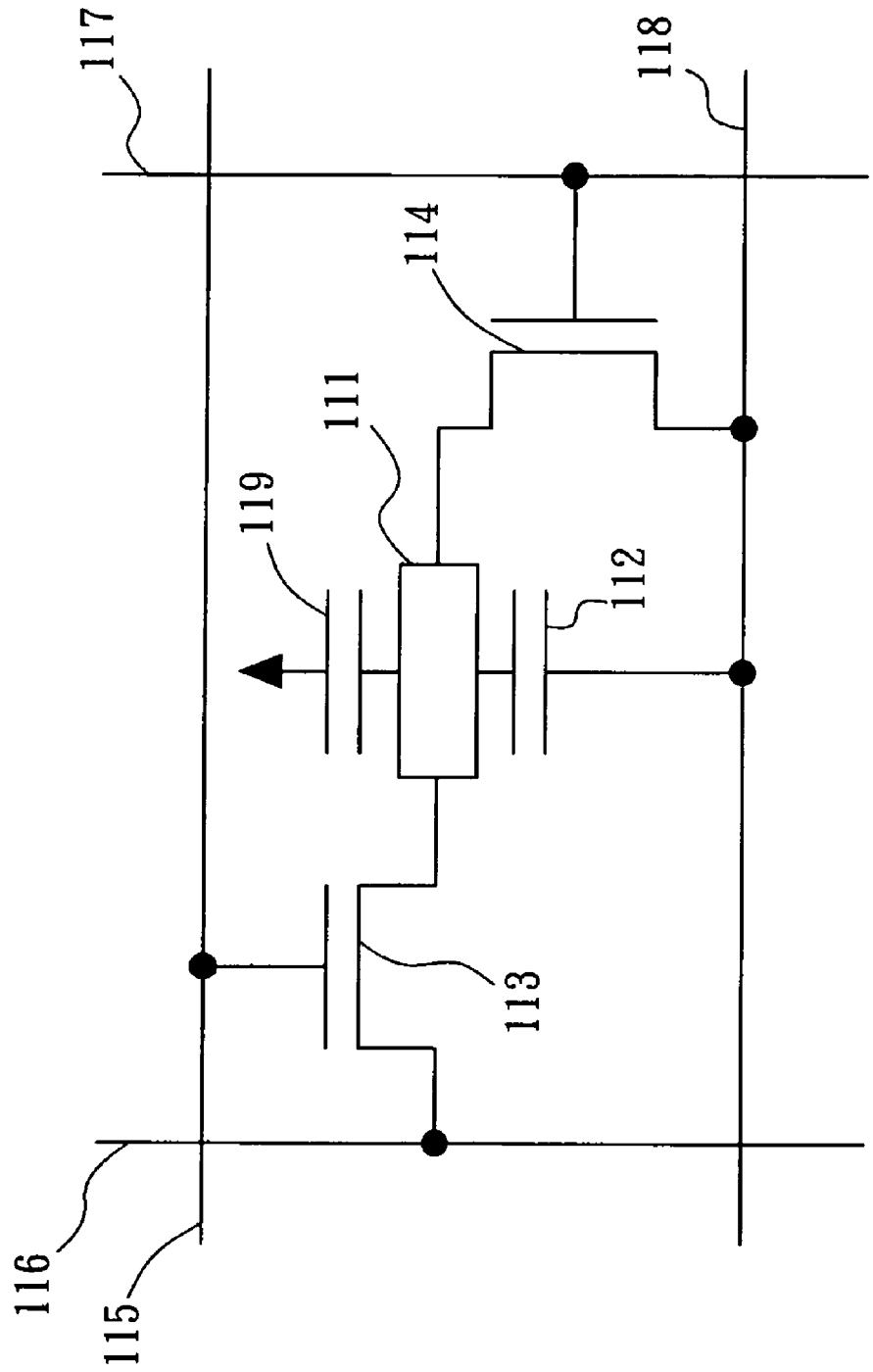
FIG. 2 is a detailed circuit diagram of the detecting unit of FIG. 1.

FIG. 2 is a detailed circuit diagram of the detecting unit 110, which includes a fingerprint electrode 111, a storage capacitor 112, a selection switch 113, a reset switch 114, a control line 115, a data line 116, a reset line 117 and a grounded line 118. The control line 115 is one of the control lines 17, the data line 116 is one of the data lines 18, and the reset line 117 is one of the reset lines 19. The selection switch 113 is coupled between the data line 116 and the fingerprint electrode 111, and receives a control signal from the control line 115 for controlling whether the selection switch 113 is closed. The reset switch 114 is coupled between the grounded line 118 and the fingerprint electrode 111, and receives a reset signal from the reset line 117 for controlling whether the reset switch 114 is closed. Both the selection switch 113 and the reset switch 114 can be transistor switches, as shown in FIG. 2. The storage capacitor 112 is formed between the fingerprint electrode 111 and the grounded line 118. A sense capacitor 119 can be formed between the fingerprint electrode 111 and a finger. Since the human body can be regarded as ground, the sense capacitor 119 is parallel connected to the storage capacitor 112, and the capacitance of the equivalent capacitor formed by both the sense capacitor 119 and the storage capacitor 112 are the sum of the capacitances of both the sense capacitor 119 and the storage capacitor 112.

The capacitance of the sense capacitor 119 formed between the fingerprint electrode 111 and the furrow is different from that of the sense capacitor 119 formed between the fingerprint electrode 111 and the ridge, as shown in FIGS. 3A and 3B. FIGS. 3A and 3B are cross-sectional diagrams of the detecting unit 110, which includes, from bottom to top, a substrate 31, the control line 115 and the grounded line 118, an insulating layer 32, an active layer 33, the data line 116, an insulating layer 34, the fingerprint electrode 111 and an insulating layer 35. The insulating layer 35 can protect the detecting unit 110 from external pollution, in addition to serving as a contact surface for the finger so as to form the sense capacitor 119. In FIG. 3A, the storage capacitor 112 is $C_s$, while the sense capacitor 119 formed between the fingerprint electrode 111 and the furrow is $C_f$, which is generated by the serial connection of capacitors $C_1$ and $C_2$. The dielectrics of $C_1$ and $C_2$ are the air and the insulating layer 35 respectively. In FIG. 3B, the storage capacitor 112 is still $C_s$, while the sense capacitor 119 formed between the fingerprint electrode 111 and the ridge is $C_r$. Since the dielectric of $C_r$ is the insulating layer 35, the capacitance of $C_r$ is equal to that of $C_2$. Thus, according to whether the fingerprint is detected and the detected fingerprint is the furrow or ridge, three kinds of cases occur as follows:

(1) The furrow is detected, and the capacitance of the equivalent capacitor $C_{eq1}=C_s+C_f$.

(2) The ridge is detected, and the capacitance of the equivalent capacitor $C_{eq2}=C_s+C_r$.

(3) No fingerprint is detected, and the capacitance of the equivalent capacitor $C_{eq3}=C_s$.

Since $C_f$ is generated by the serial connection of capacitors $C_1$ and $C_2$, it can be derived that $C_f<C_2=C_r$. Therefore, $$C_{eq2}>C_{eq1}>C_{eq3} \qquad \text{Eq(1a)}$$

By Eq(1a), the detecting unit 110 can determine whether the fingerprint is detected and whether the detected fingerprint is the furrow or ridge, as described later. In FIGS. 3A and 3B, the detecting unit 110 can be implemented by, including but not limited to, the manufacturing process of Thin Film Transistor (TFT), Metal-Oxide-Semiconductor Field-Effect Transistor (MOSFET), etc. Also, the material used for the fingerprint electrode 110 and each insulating layer is not limited.

It is notable that FIGS. 3A and 3B are just an embodiment, and the layout of the components of the detecting unit 110 is not limited thereto. For example, in another embodiment, the insulating layer 35 in FIGS. 3A and 3B is omitted. Thus, in FIG. 3A, the sense capacitor 119 formed between the fingerprint electrode 111 and the furrow becomes $C_1$, while the storage capacitor 112 is still $C_s$; in FIG. 3B, since the fingerprint electrode 111 contacts with the ridge directly, the sense capacitor 119 is not formed and the storage capacitor 112 is kept disabled with its two ends coupled to ground. Therefore, when the detecting unit 110 detects the furrow, the capacitance of the equivalent capacitor $C_{eq1}=C_s+C_1$; when the ridge is detected, the capacitance of the equivalent capacitor $C_{eq2}=0$; when no fingerprint is detected, the capacitance of the equivalent capacitor $C_{eq3}=C_s$. That is, $$C_{eq1}>C_{eq3}>C_{eq2} \qquad \text{Eq(1b)}$$

By Eq(1b), the detecting unit 110 can also determine whether the fingerprint is detected and whether the detected fingerprint is the furrow or ridge.

The operation of the fingerprint detection device 10 is explained as follows (please refer to FIG. 1 and FIG. 2):

(1) Before the fingerprint detection is performed, the resetting circuit 16 provides the reset signal to each detecting unit 110 via the reset lines 19 to close the reset switch 114 of the detecting unit 110, so as to make the capacitors within the detecting unit 110 fully discharge and force the voltage level of the fingerprint electrode 111 to zero. In this manner, in addition to removing the charges left by the last detection, the static electricity existed between the surface of the finger and the fingerprint electrode 111 can also be removed, thereby upgrading the immunity of the fingerprint electrode 111 against external static electricity.

(2) Next, during a write interval, the selecting circuit 15 orderly issues the control signal via each control line 17 to select each row of detecting units of the detecting matrix 11 in order, so as to keep the selection switch 113 of each selected detecting unit 110 closed. On the other hand, the switching circuit 14 switches the data lines 18 to the driving circuit 12 during the write interval such that the driving circuit 12 can provide the charging signal via the data lines 18. Thus, each selected detecting unit 110 can receive the charging signal from the data line 18 coupled to its selection switch 113, so as to charge the equivalent capacitor within the selected detecting unit 110, i.e. perform a data writing operation.

(3) During a read interval after the write interval, the selecting circuit 15 orderly issues the control signal via each control line 17 again to select each row of detecting units of the detecting matrix 11 in order, so as to keep the selection switch 113 of each selected detecting unit 110 closed. On the other hand, the switching circuit 14 switches the data lines 18 to the reading circuit 13 during the read interval such that the reading circuit 12 can read the voltage of the storage capacitor 112 of each selected detecting unit 110 (i.e. the voltage of the fingerprint electrode 111 in FIG. 2).

Since each detecting unit 110 has the selection switch 113, the detecting unit 110 will be performed a data writing or reading operation only when its selection switch 113 is closed, i.e. only when the detecting unit 110 is selected. In this manner, the mutual interference between adjacent detecting units can be effectively avoided.

Figure 4:
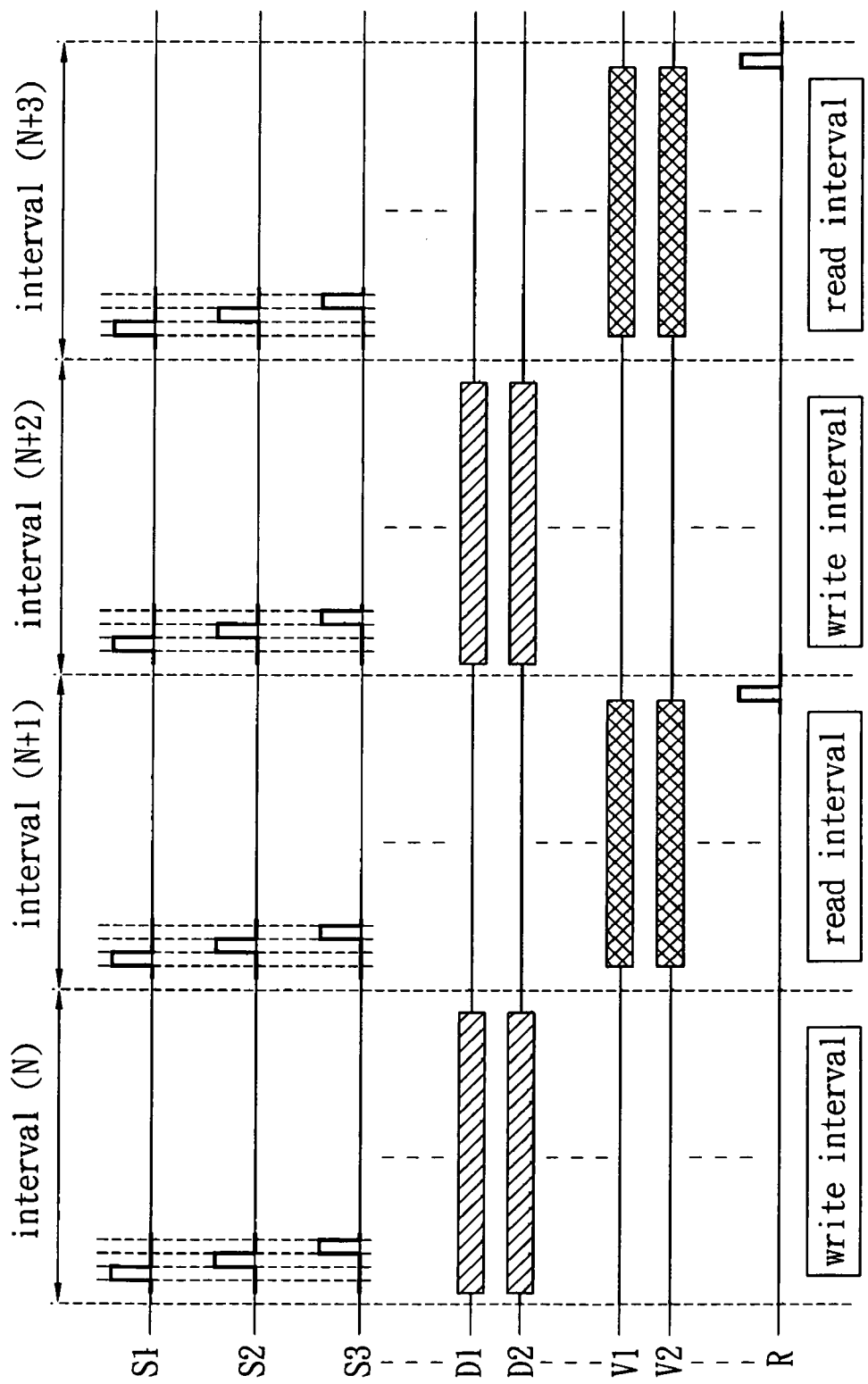
FIG. 4 is a timing diagram of the related signals of the fingerprint detection device of FIG. 1.

FIG. 4 is a timing diagram of the related signals of the fingerprint detection device 10. In FIG. 4, the write interval and the read interval appear orderly and repeatedly on the time axis (i.e. the horizontal axis). The control signal in each control line 17 (S1, S2, S3 . . . respectively represent the control signal in $1^{st}$, $2^{nd}$, $3^{rd}$ . . . control line 17) appears in order during both the write interval and the read interval, so as to select a row of detecting units 110 in order. During the write interval, each data line 18 transmits the charging signal (D1, D2 . . . respectively represent the charging signal in $1^{st}$, $2^{nd}$ . . . data line 18) so as to charge the row of detecting units 110 selected by the control line 17, wherein the length of charging time for each row of detecting units 110 is the pulse width of the control signal; during the read interval, each data line 18 transmits the voltage value read from the storage capacitor 112 (V1, V2 . . . respectively represent the voltage value in $1^{st}$, $2^{nd}$ . . . data line 18). The reset signal R in each reset line 19 appears at the end of each read interval, so as to force the voltage level of the fingerprint electrode 111 to zero. Please note that the reset signal R can also appear at the start of each write interval instead (not shown) so as to achieve the same resetting effect.

During the write interval, since each detecting unit 110 is charged with the same charging signal (e.g. a constant voltage), given electric quantity (Q)=capacitance (C)×voltage (V), the charge quantity $Q_d$ of the detecting unit 110 is proportional to the capacitance of the equivalent capacitor. Thus, in the embodiment where the detecting unit 110 is covered with the insulating layer 35 (see FIGS. 3A and 3B), it can be derived from Eq(1a) that $$Q_d(\text{ridge detected}) > Q_d(\text{furrow detected}) > Q_d(\text{no fingerprint detected}) \quad \text{Eq(2a)}$$

During the read interval, the voltage read from the storage capacitor 112 of the detecting unit 110 (i.e. the voltage $V_f$ of the fingerprint electrode 111) is proportional to the charge quantity $Q_d$ during the previous write interval. Thus, it can be derived from Eq(2a) that $$V_f(\text{ridge detected}) > V_f(\text{furrow detected}) > V_f(\text{no fingerprint detected}) \quad \text{Eq(3a)}$$

Therefore, by reading the voltage of the storage capacitor 112 of each detecting unit 110 and using Eq(3a), the fingerprint detection device 10 can determine whether the detecting unit 110 detects the fingerprint and whether the detected fingerprint is the furrow or ridge. FIG. 5 shows the voltage values read from each detecting unit 110 of the detecting matrix 11 (taking 11 rows×10 columns as example), where the high voltage value (representing the ridge) is shown as H, the intermediary voltage value (representing the furrow) is shown as M, and the low voltage value (representing no fingerprint) is shown as L. The area formed by the thick lines is the detected fingerprint.

Similarly, in the embodiment where the detecting unit 110 is not covered with the insulating layer 35 (i.e. the insulating layer 35 of the embodiment in FIGS. 3A and 3B is omitted), it can be derived from Eq(1b) that $$Q_d(\text{furrow detected}) > Q_d(\text{no fingerprint detected}) > Q_d(\text{ridge detected}) \quad \text{Eq(2b)}$$

$$V_f(\text{furrow detected}) > V_f(\text{no fingerprint detected}) > V_f(\text{ridge detected}) \quad \text{Eq(3b)}$$

By reading the voltage of the storage capacitor 112 of each detecting unit 110 and using Eq(3b), the fingerprint detection device 10 can also determine whether the detecting unit 110 detects the fingerprint and whether the detected fingerprint is the furrow or ridge.

Figure 6:
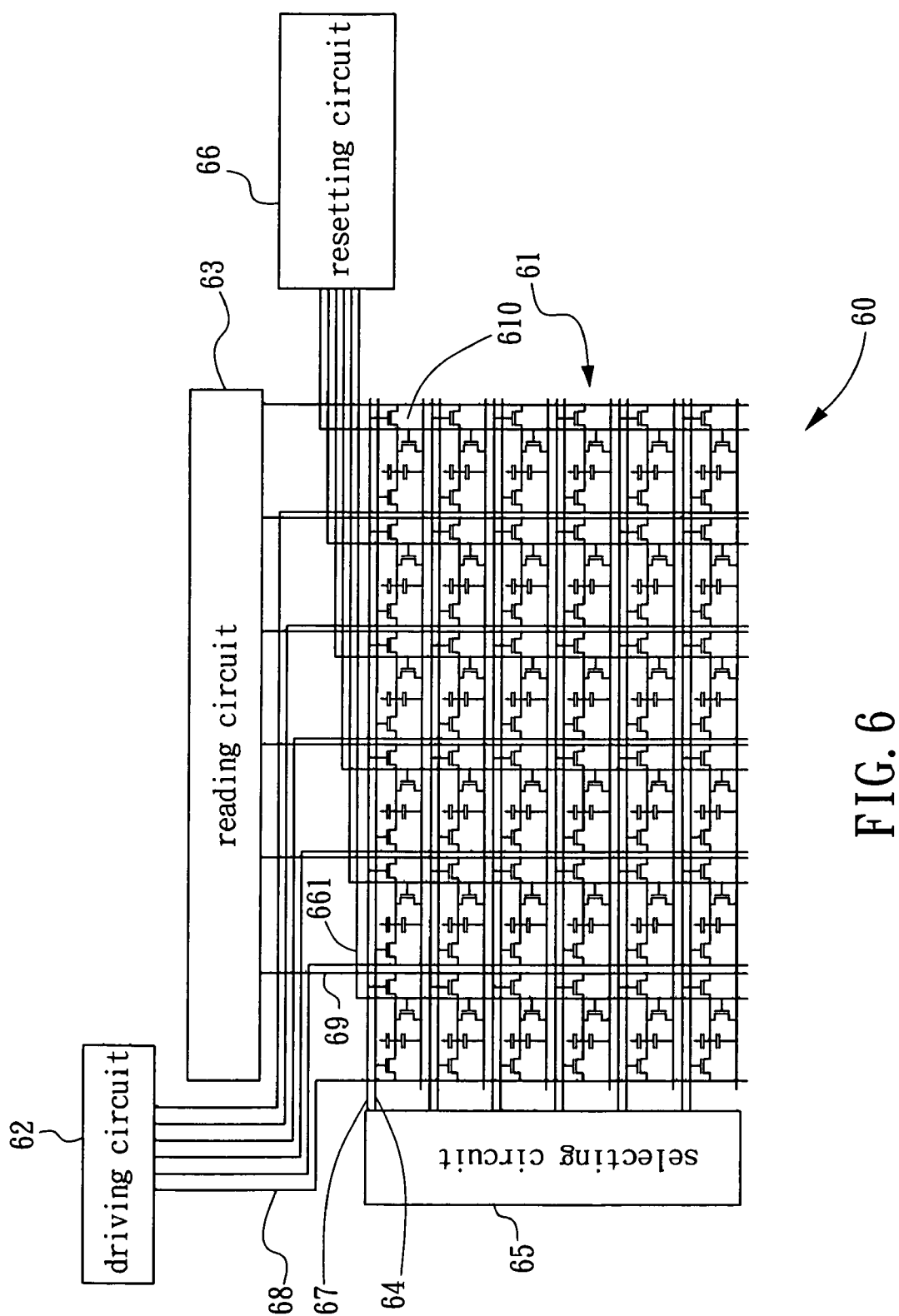
FIG. 6 is a block diagram of the second preferred embodiment of the capacitive fingerprint detection device according to the present invention.

FIG. 6 is a block diagram of the second preferred embodiment of the capacitive fingerprint detection device according to the present invention, wherein the fingerprint detection device 60 includes a detecting matrix 61, a driving circuit 62, a reading circuit 63, a selecting circuit 65 and a resetting circuit 66. The detecting matrix 61 includes a plurality of detecting units 610 which are configured as a plurality of horizontal rows and vertical columns (In FIG. 6, the detecting matrix 61 is shown as, but not limited to, six rows and six columns). The selecting circuit 65 is coupled to the detecting matrix 61 via a plurality of first control lines 64 and second control lines 67, and each first control line 64 and each second control line 67 is respectively coupled to one row of detecting units 610. The driving circuit 62 is coupled to the detecting matrix 61 via a plurality of first data lines 68, and each first data line 68 is coupled to one column of detecting units 610. The reading circuit 63 is coupled to the detecting matrix 61 via a plurality of second data lines 69, and each second data line 69 is coupled to one column of detecting units 610. The resetting circuit 66 is coupled to the detecting matrix 61 via a plurality of reset lines 661, and each reset line 661 is coupled to one column of detecting units 610.

Figure 7:
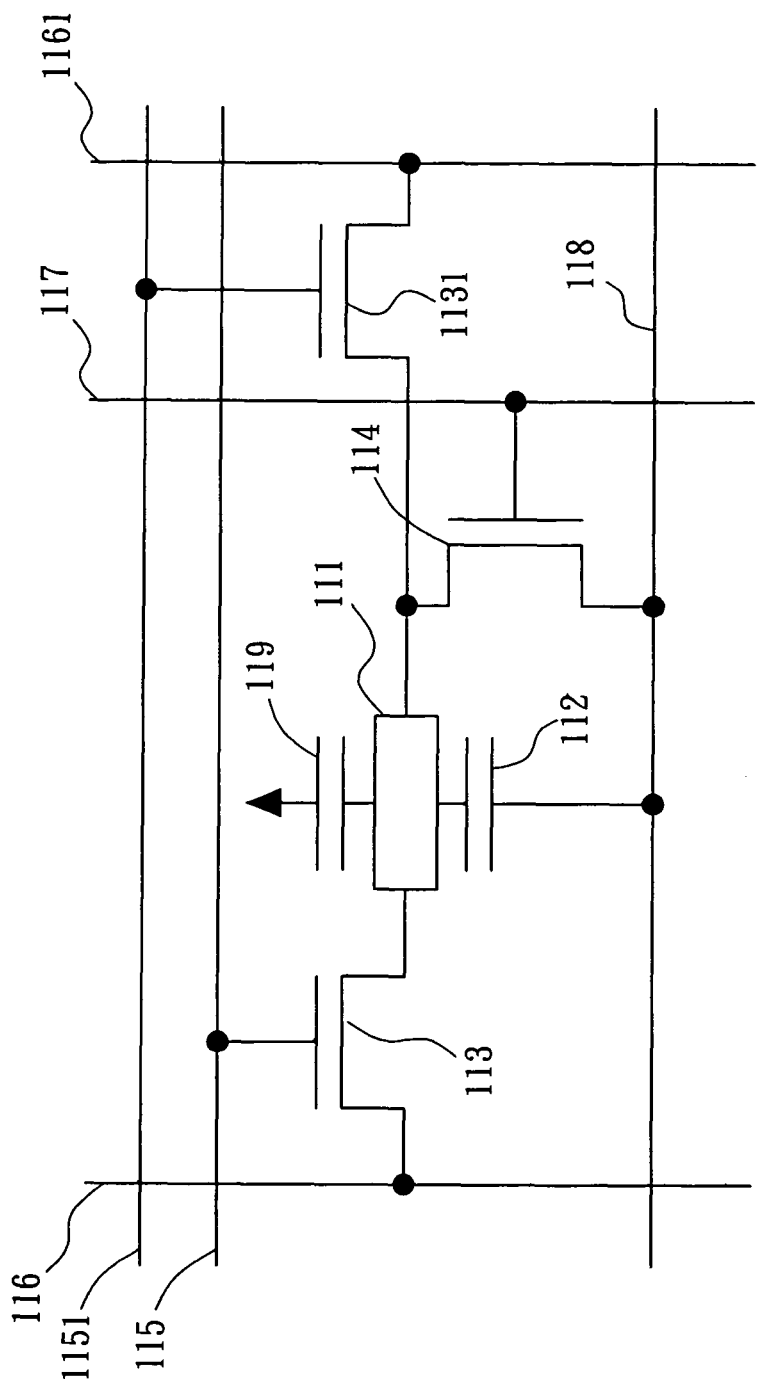
FIG. 7 is a detailed circuit diagram of the detecting unit of FIG. 6.

FIG. 7 is a detailed circuit diagram of the detecting unit 610. Compared with the detecting unit 110 of FIG. 2, the detecting unit 610 adds a read switch 1131, a control line 1151 and a data line 1161. The control lines 115 and 1151 are one of the first control lines 64 and one of the second control lines 67 respectively, the data lines 116 and 1161 are one of the first data lines 68 and one of the second data lines 69 respectively, and the reset line 117 is one of the reset lines 661. In operation, the main difference between the detecting unit 610 and the detecting unit 110 is that the detecting unit 610 performs the data writing operation and the data reading operation by different sets of control line and data line (i.e. control line 115 and data line 116 for writing, control line 1151 and data line 1161 for reading), while the detecting unit 110 performs both the operations by the same set of control line and data line (i.e. control line 115 and data line 116). The selection switch 113 receives a first control signal from the control line 115 for controlling whether the data line 116 is connected to the fingerprint electrode 111, while the read switch 1131 receives a second control signal from the control line 1151 for controlling whether the data line 1161 is connected to the fingerprint electrode 111. The reset switch 114 receives a reset signal from the reset line 117 for controlling whether the fingerprint electrode 111 is connected to the grounded line 118. Besides, the sense capacitor 119 is still parallel connected to the storage capacitor 112, and the capacitance of the equivalent capacitor formed by both the capacitors are the sum of the capacitances of both the capacitors.

The operation of the fingerprint detection device 60 is explained as follows (please refer to FIG. 6 and FIG. 7):

(1) Before starting the fingerprint detection, a reset operation is performed in the way similar to the fingerprint detection device 10. Please refer to the above description for more details.

(2) Next, during a write interval, the selecting circuit 65 orderly issues the first control signal via each first control line 64 to select each row of detecting units of the detecting matrix 61 in order, so as to keep the selection switch 113 of each selected detecting unit 610 closed. On the other hand, the driving circuit 62 issues the charging signal via the first data lines 68 during the write interval such that each selected detecting unit 610 can receive the charging signal from the first data line 68 coupled to its selection switch 113, so as to charge the equivalent capacitor within the selected detecting unit 610, i.e. perform a data writing operation.

(3) During a read interval after the write interval, the selecting circuit 65 orderly issues the second control signal via each second control line 67 to select each row of detecting units of the detecting matrix 61 in order, so as to keep the read switch 1131 of each selected detecting unit 610 closed. On the other hand, the reading circuit 63 reads the voltage of the storage capacitor 112 of each selected detecting unit 610 via the second data line 69 coupled to the read switch 1131 during the read interval.

Figure 8:
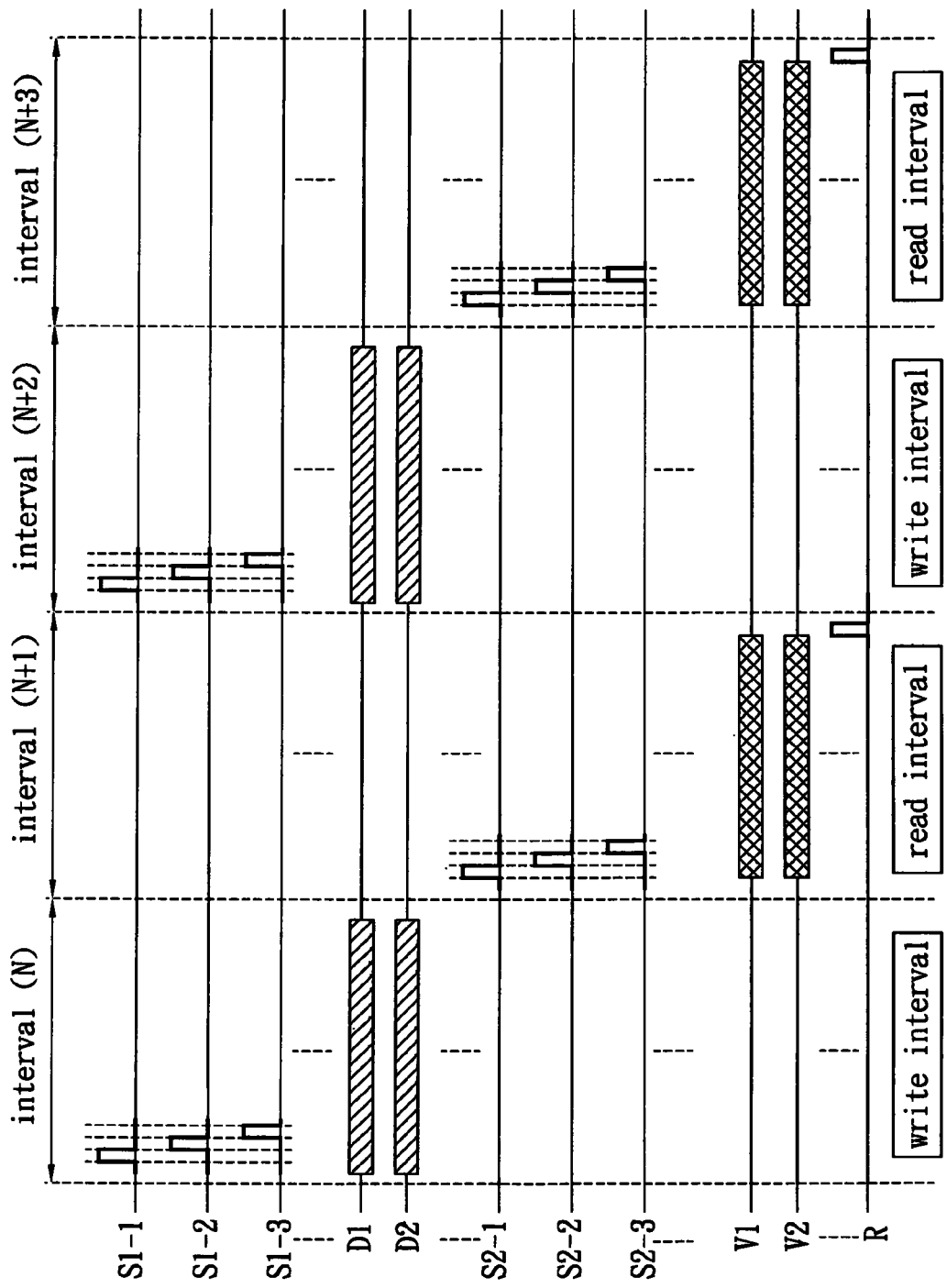
FIG. 8 is a timing diagram of the related signals of the fingerprint detection device of FIG. 6.

FIG. 8 is a timing diagram of the related signals of the fingerprint detection device 60. In FIG. 6, the write interval and the read interval appear orderly and repeatedly on the time axis (i.e. the horizontal axis). The first control signal in each first control line 64 (S1-1, S1-2, S1-3 . . . respectively represent the first control signal in $1^{st}$, $2^{nd}$, $3^{rd}$ . . . first control line 64) appears in order during the write interval, so as to select a row of detecting units 610 in order; the second control signal in each second control line 67 (S2-1, S2-2, S2-3 . . . respectively represent the second control signal in $1^{st}$, $2^{nd}$, $3^{rd}$ . . . second control line 67) appears in order during the read interval, so as to select a row of detecting units 610 in order. During the write interval, each first data line 68 transmits the charging signal (D1, D2 . . . respectively represent the charging signal in $1^{st}$, $2^{nd}$ . . . first data line 68) so as to charge the row of detecting units 610 selected by the first control line 64; during the read interval, each second data line 69 transmits the voltage value read from the storage capacitor 112 (V1, V2 . . . respectively represent the voltage value in $1^{st}$, $2^{nd}$ . . . second data line 69). The reset signal R in each reset line 661 appears at the end of each read interval, so as to force the voltage level of the fingerprint electrode 111 to zero. Please note that the reset signal R can also appear at the start of each write interval instead (not shown) so as to achieve the same resetting effect.

Figure 9:
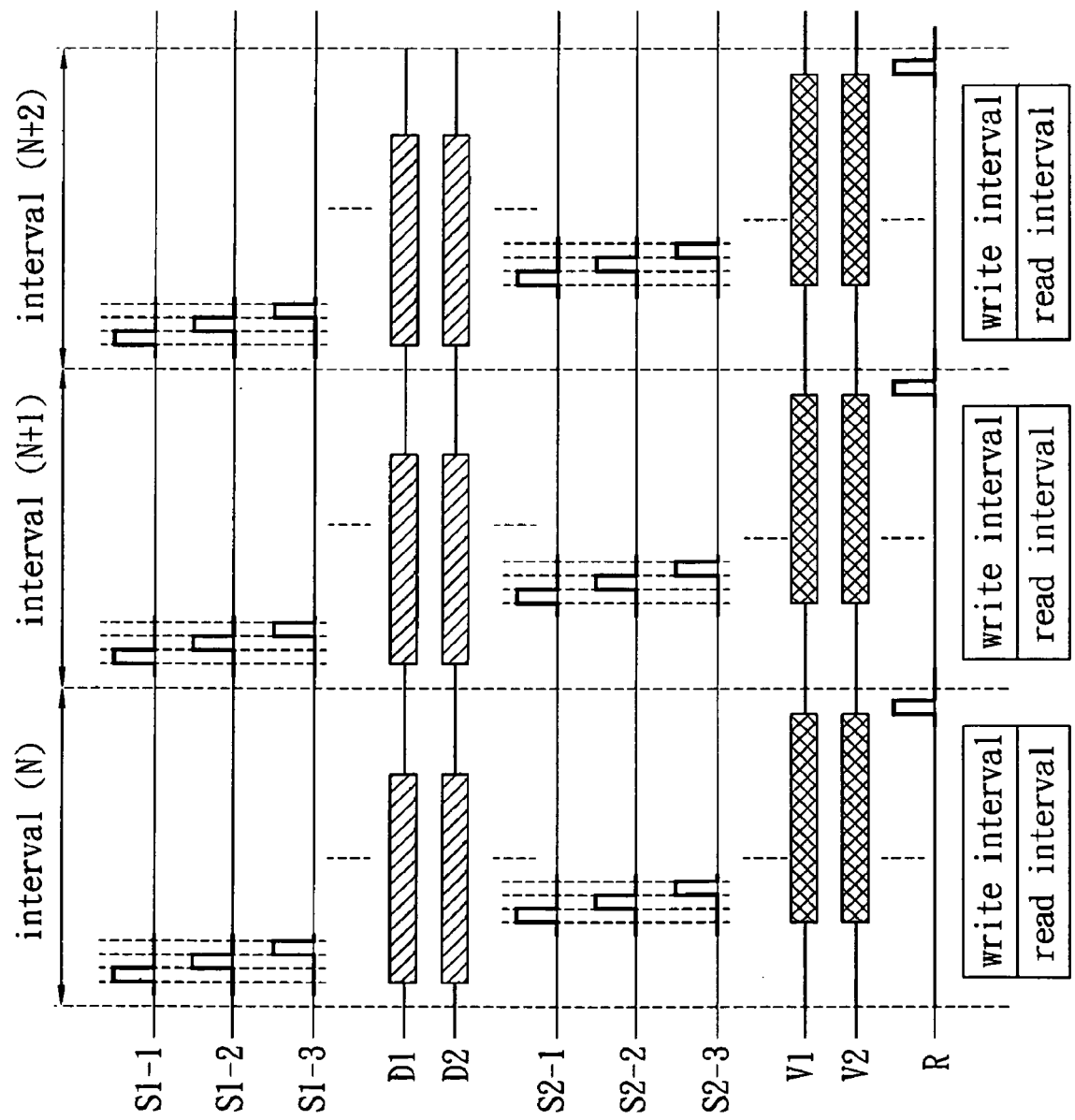
FIG. 9 is another timing diagram of the related signals of the fingerprint detection device of FIG. 6.

In the second preferred embodiment, the fingerprint detection device 60 can also perform the data writing and reading operations during the same interval, as shown in FIG. 9 (with the same signal denotation as FIG. 8). In FIG. 9, the write interval and the read interval are the same interval on the time axis, and for the same row of detecting units, the first control signal for enabling the data writing operation is earlier than the second control signal for enabling the data reading operation.

Please note that in the first and second preferred embodiments, instead of selecting only one row of detecting units one time, the selecting circuits 15 and 65 can also select multiple rows of detecting units one time to perform the data writing operation.

Figure 10:
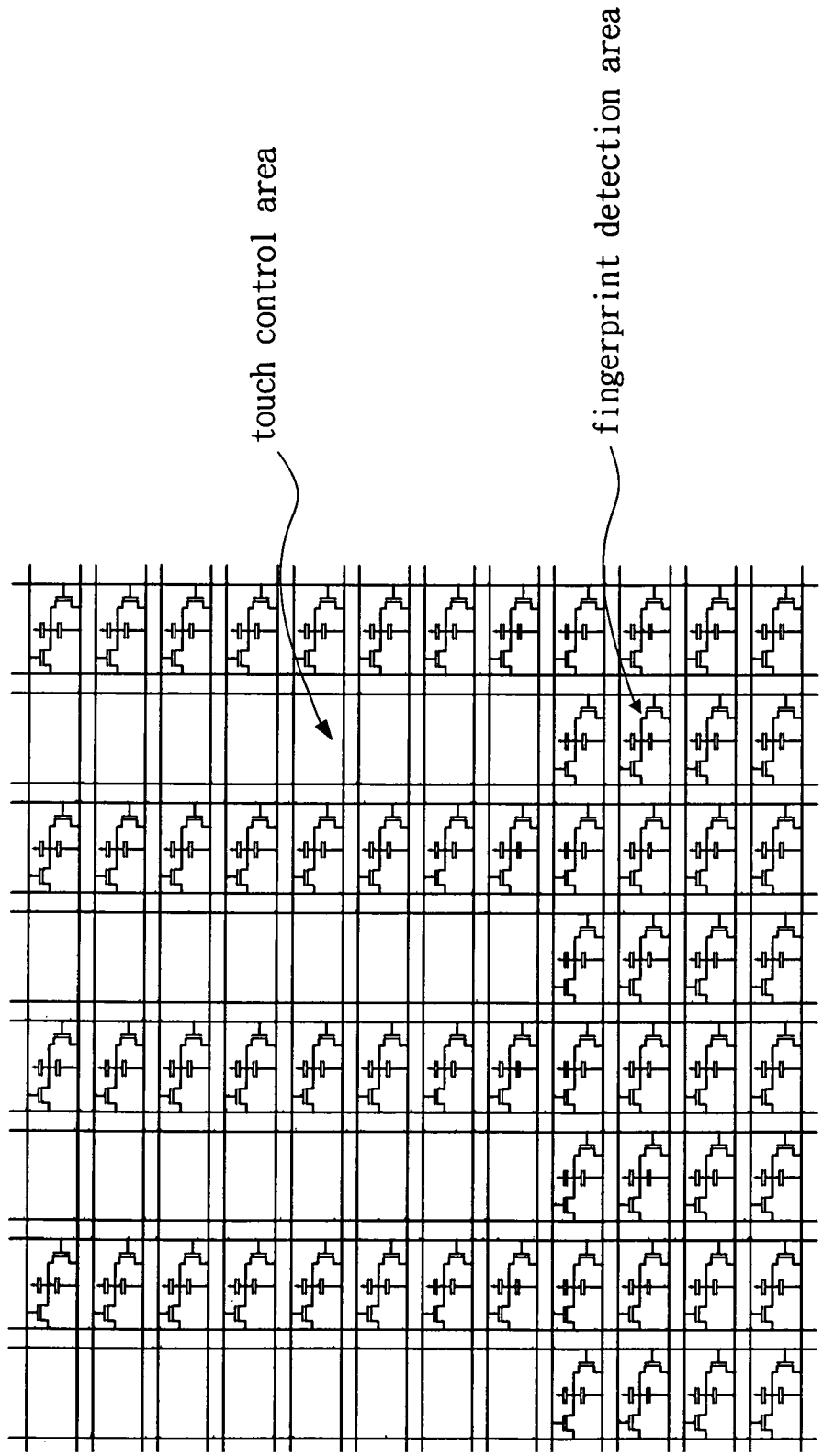
FIG. 10 shows an embodiment of the touch control device with fingerprint detection according to the present invention.

The fingerprint detection devices 10 and 60 can also be used as a touch pad for performing touch control function. Please refer to FIG. 5. After reading the voltage value from each detecting unit 110 and 610, the fingerprint detection devices 10 and 60 can set a reference point within the fingerprint detected area, e.g. the center point of the fingerprint detected area. The reference point can be denoted as (x,y) coordinates. By tracking the reference point of the fingerprint detected area at different time points, the fingerprint detection devices 10 and 60 can determine the location and moving direction of the finger. Besides, since the detecting matrixes 11 and 61 can be implemented as a large area, they can also detect multiple fingerprints simultaneously, thereby performing multi-touch function. However, since the touch control function requires just the location detection of the whole finger rather than the detailed furrow or ridge, the density of detecting unit (i.e. the number of detecting units in unit area) required for the touch control function is smaller than that required for the fingerprint detection function. Therefore, the present invention provides a touch control device with fingerprint detection that includes a plurality of detecting units (e.g. detecting unit 110 or 610) configured as a fingerprint detecting area and a touch control area. The density of detecting unit of the fingerprint detecting area is larger than that of the touch control area. In this manner, the touch control device can provide both the functions of fingerprint detection and touch control simultaneously, and also lower the overall circuit cost. FIG. 10 shows an embodiment where the density of detecting unit of the fingerprint detecting area is larger than that of the touch control area.

Figure 11:
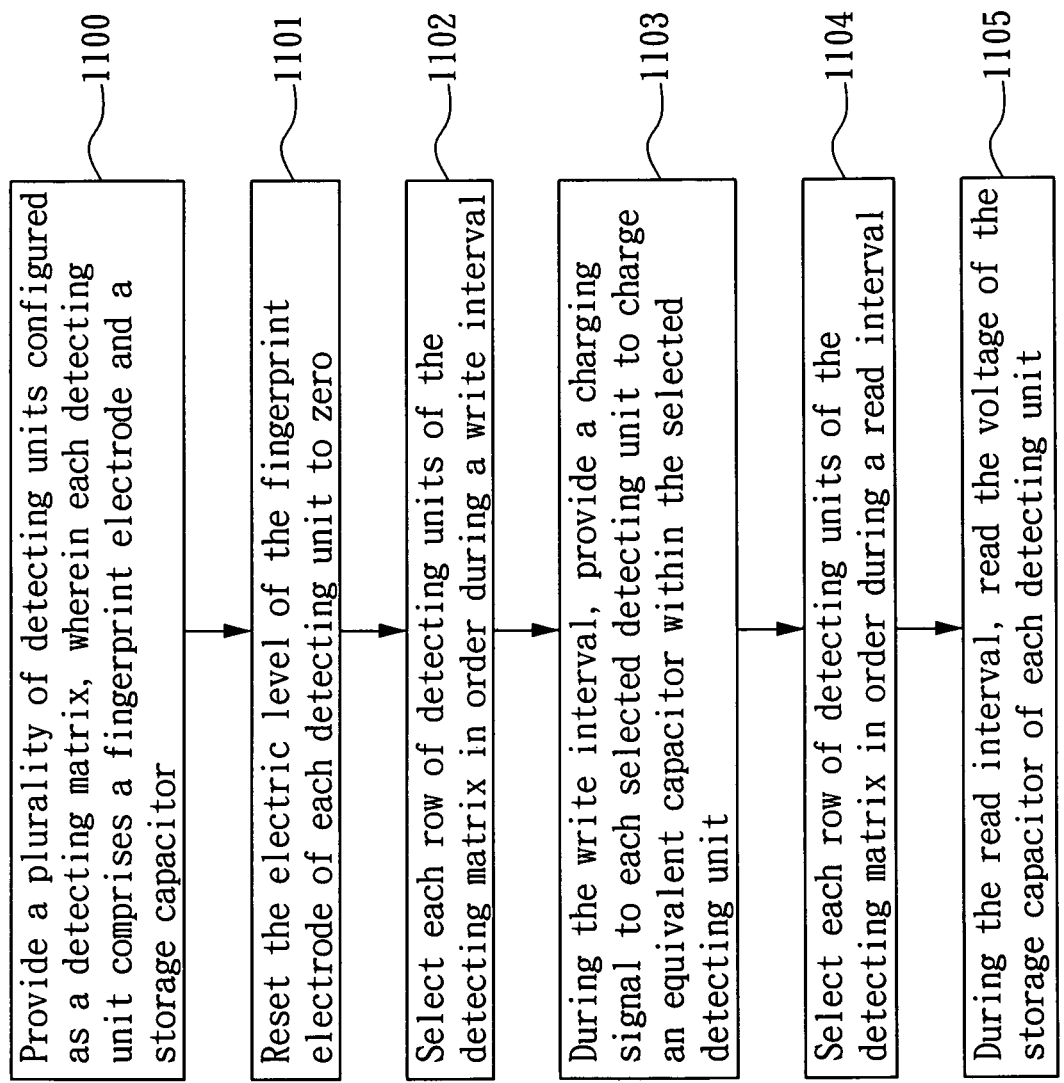
FIG. 11 is a flow chart of a preferred embodiment of the fingerprint detection method according to the present invention.

FIG. 11 is a flow chart of a preferred embodiment of the fingerprint detection method according to the present invention, which includes the following steps:

Step 1100: Provide a plurality of detecting units configured as a detecting matrix having a plurality of rows and columns, wherein each detecting unit comprises a fingerprint electrode and a storage capacitor coupled to the fingerprint electrode, while a sense capacitor formed between the fingerprint electrode and a finger is parallel connected to the storage capacitor.

Step 1101: Reset the electric level of the fingerprint electrode of each detecting unit to zero.

Step 1102: Select each row of detecting units of the detecting matrix in order during a write interval.

Step 1103: During the write interval, provide a charging signal to each selected detecting unit to charge an equivalent capacitor within the selected detecting unit, wherein the capacitance of the equivalent capacitor is determined according to whether the sense capacitor is formed within the selected detecting unit.

Step 1104: Select each row of detecting units of the detecting matrix in order during a read interval.

Step 1105: During the read interval, read the voltage of the storage capacitor of each detecting unit.

Step 1100 can further provide an insulating layer to cover the detecting matrix as a contact surface for the finger.

In this preferred embodiment, the read interval lies after the write interval so as to ensure that each row of detecting units has already performed the data writing operation before performing the data reading operation. In another embodiment, both the read interval and the write interval lie in the same interval, and for any row of detecting units, steps 1102 and 1103 are executed before steps 1104 and 1105 so as to ensure that the row of detecting units has already performed the data writing operation before performing the data reading operation.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A touch control device with fingerprint detection comprising:
   a plurality of detecting units configured as a detecting matrix having a plurality of rows and columns, each of the detecting units comprising a fingerprint electrode, a first switch coupled to the fingerprint electrode, and a storage capacitor coupled to the fingerprint electrode; wherein when a finger is touching one of the detecting units, a sense capacitor is formed between the fingerprint electrode of that touched detecting unit and the finger in such a manner that the sense capacitor is connected in parallel to the storage capacitor to form an equivalent capacitor;
   a driving circuit, coupled to the detecting units, for providing a charging signal to charge the equivalent capacitor within each of the detecting units, wherein a capacitance of the equivalent capacitor is determined in part according to whether the sense capacitor is formed within the detecting unit;
   a reading circuit, coupled to the detecting units, for reading a voltage of the equivalent capacitor of each of the detecting units after the equivalent capacitor is charged;
   a selecting circuit, coupled to the detecting matrix via a plurality of control lines, each of the control lines being coupled to one row of the detecting units, for selecting each row of the detecting units in order during a write interval and a read interval respectively, wherein the write interval occurs before the read interval; wherein, the driving circuit provides the charging signal to the selected detecting units via the first switch during the write interval, and the reading circuit reads the voltage of the equivalent capacitor of each selected detecting unit via the same first switch during the read interval; and
   a switching circuit, coupled to the driving circuit and the reading circuit, for coupling to the detecting matrix via a plurality of data lines, wherein each of the data lines is coupled to one column of the detecting units; wherein the switching circuit couples the data lines to the driving circuit during the write interval, and couples the data lines to the reading circuit during the read interval;
   wherein the first switch of each of the detecting units is coupled between one of the data lines and the fingerprint electrode and receives a control signal from one of the control lines so as to control whether the first switch is closed;
   wherein the first switch of the selected detecting unit is closed during the write interval such that the selected detecting unit receives the charging signal via the data line coupled to the first switch; the first switch of the selected detecting unit is closed during the read interval such that the reading circuit performs reading via the same data line coupled to the first switch;
   wherein the detecting units are configured within the detecting matrix as a fingerprint detecting area and a touch control area, and
   wherein a density of the detecting units within the fingerprint detecting area is greater than the density of the detecting units within the touch control area.

2. The touch control device with fingerprint detection of claim 1, wherein each of the detecting units further comprises a second switch coupled between the fingerprint electrode and a grounded line, and the touch control device with fingerprint detection further comprises: a resetting circuit, coupled to the detecting units, for providing a reset signal to the detecting units so as to control whether the second switch of the detecting unit is closed.

3. The touch control device with fingerprint detection of claim 2, wherein the second switch of the detecting unit is closed before the driving circuit provides the charging signal to the detecting unit or after the reading circuit reads the voltage of the equivalent capacitor of the detecting unit.

4. The touch control device with fingerprint detection of claim 1, wherein when the sense capacitor is formed within the detecting unit, the capacitance of the equivalent capacitor of the detecting unit is determined according to a sum of capacitances of both the storage capacitor and the sense capacitor.

5. A touch control with fingerprint detection method comprising steps of:
   providing a touch control with fingerprint detection device comprising a plurality of detecting units, a driving circuit, a reading circuit, a selecting circuit and a switching circuit; said plurality of detecting units being configured as a detecting matrix having a plurality of rows and columns, each of the detecting units comprising a fingerprint electrode, a first switch coupled to the fingerprint electrode, and a storage capacitor coupled to the fingerprint electrode; wherein when a finger is touching one of the detecting units, a sense capacitor is formed between the fingerprint electrode of that touched detecting unit and the finger in such a manner that the sense capacitor is connected in parallel to the storage capacitor to form an equivalent capacitor; said driving circuit being coupled to the detecting units; said reading circuit being coupled to the detecting units; said selecting circuit being coupled to the detecting matrix via a plurality of control lines, each of the control lines being coupled to one row of the detecting units;
   during a write interval, said selecting circuit selecting each row of the detecting units in order, and the driving circuit providing a charging signal to charge the equivalent capacitor within each of the selected detecting units, wherein a capacitance of the equivalent capacitor is determined in part according to whether the sense capacitor is formed within the detecting unit; and
   during a read interval, wherein the read interval lies after the write interval, said selecting circuit selecting each row of the detecting units in order, and said reading circuit reading a voltage of the equivalent capacitor of each of the selected detecting units after the equivalent capacitor is charged;
   wherein, the driving circuit provides the charging signal to the selected detecting units via the first switch during the write interval, and the reading circuit reads the voltage of the equivalent capacitor of each selected detecting unit via the same first switch during the read interval;
   wherein, said switching circuit being coupled to the driving circuit and the reading circuit for coupling to the detecting matrix via a plurality of data lines, each of the data lines is coupled to one column of the detecting units;
   wherein the switching circuit couples the data lines to the driving circuit during the write interval, and couples the data lines to the reading circuit during the read interval;
   wherein the first switch of each of the detecting units is coupled between one of the data lines and the fingerprint electrode and receives a control signal from one of the control lines so as to control whether the first switch is closed;
   wherein the first switch of the selected detecting unit is closed during the write interval such that the selected detecting unit receives the charging signal via the data line coupled to the first switch;

wherein the first switch of the selected detecting unit is closed during the read interval such that the reading circuit performs reading via the same data line coupled to the first switch;

wherein the detecting units are configured within the detecting matrix as a fingerprint detecting area and a touch control area, and wherein a density of the detecting units within the fingerprint detecting area is greater than the density of the detecting units within the touch control area.

6. The touch control with fingerprint detection method of claim 5, wherein, each of the detecting units further comprises a second switch coupled between the fingerprint electrode and a grounded line, and the touch control with fingerprint detection device further comprises a resetting circuit coupled to the detecting units for providing a reset signal to the detecting units so as to control whether the second switch of the detecting unit is closed;

wherein, before charging the equivalent capacitor, said fingerprint detection method further comprises the following step:

said resetting circuit providing said reset signal to the detecting units in order to reset an voltage level of the fingerprint electrode of each of the detecting units to zero.

7. The touch control with fingerprint detection method of claim 5, wherein, each of the detecting units further comprises second switch coupled between the fingerprint electrode and a grounded line, and the touch control with fingerprint detection device further comprises a resetting circuit coupled to the detecting units for providing a reset signal to the detecting units so as to control whether the second switch of the detecting unit is closed;

wherein, after reading the voltage of the equivalent capacitor, said touch control with fingerprint detection method further comprises the following step:

said resetting circuit providing said reset signal to the detecting units in order to reset an voltage level of the fingerprint electrode of each of the detecting units to zero.

* * * * *